March 8, 1927.

J. COOK 1,619,919

LIQUID MEASURING GAUGE

Filed Oct. 12, 1925      2 Sheets-Sheet 1

Inventor:
Joseph Cook
By Wm. O. Belt
Atty.

March 8, 1927.
J. COOK
1,619,919
LIQUID MEASURING GAUGE
Filed Oct. 12, 1925  2 Sheets-Sheet 2
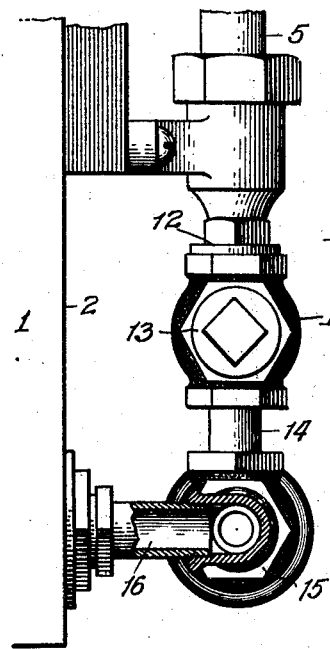
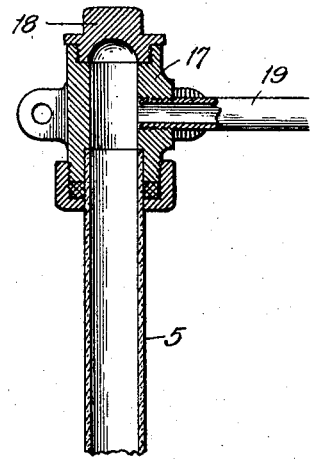
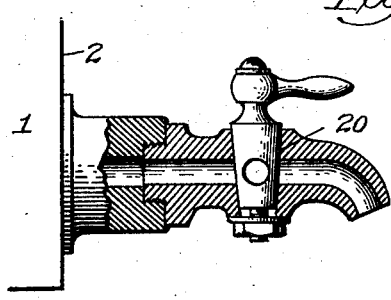
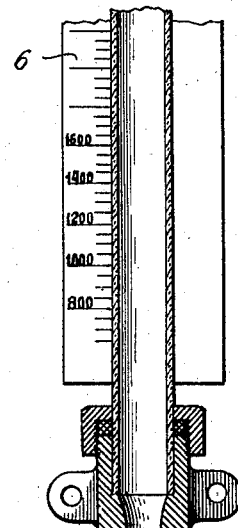
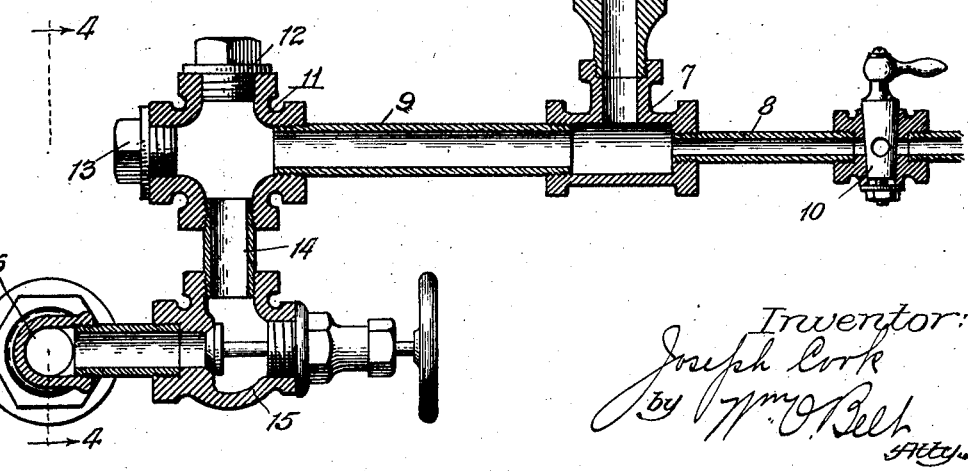

Patented Mar. 8, 1927.

1,619,919

UNITED STATES PATENT OFFICE.

JOSEPH COOK, OF CHICAGO, ILLINOIS, ASSIGNOR TO BLUE VALLEY CREAMERY COMPANY, OF CHICAGO, ILLINOIS, A CORPORATION OF DELAWARE.

LIQUID-MEASURING GAUGE.

Application filed October 12, 1925. Serial No. 61,903.

This invention relates to a novel and improved gauge for use in measuring a liquid and more particularly for weighing a large volume of liquid. The device forming the subject matter of my invention finds particular use in the dairy industry wherein it is necessary to determine the weight of a large volume of cream or milk contained in a receptacle such as a vat. I have accordingly shown and will describe my invention as employed in connection with a receptacle adapted to contain cream or milk, although it will be evident that it is by no means limited to such use.

My invention will be better understood from a description of the selected embodiment which I have shown in the accompanying drawing in which;

Fig. 3 is a section on the line 3—3 of Fig. 2.

Fig. 4 is a view taken on the line 4—4 of Fig. 3.

Fig. 5 is a section taken on the line 5—5 of Fig. 2.

Figure 1:
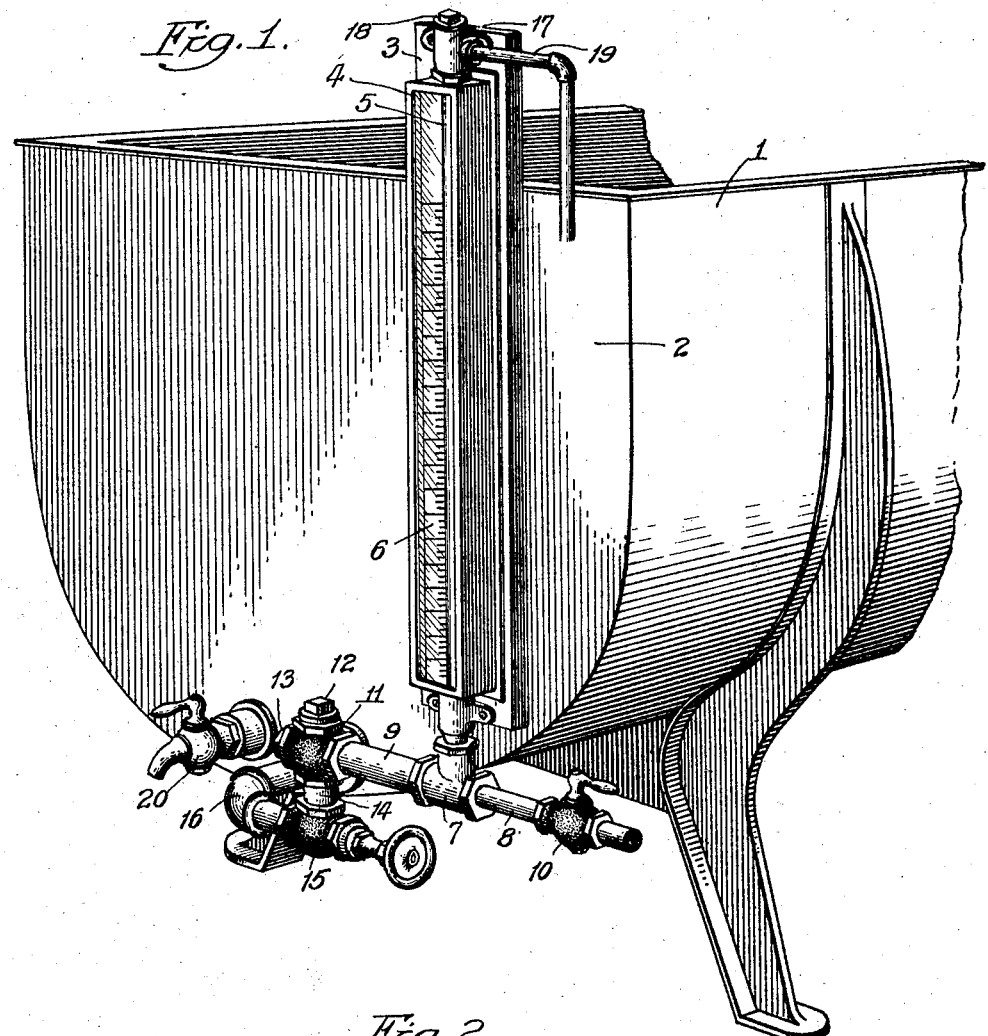
Fig. 1 is a perspective view of one end of a receptacle having my invention applied thereto.
Figure 2:
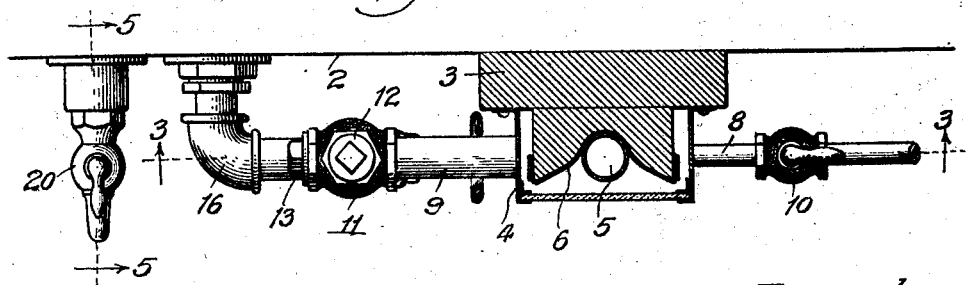
Fig. 2 is a horizontal plan view of my invention partly in section.

Referring now to the drawings I have shown my invention as applied to one end of a receptacle 1 in the form of a vat employed as a ripener and into which milk or cream is deposited. Secured to the end 2 of the receptacle 1 is a board 3 having mounted thereon a casing 4 enclosing the gauge tube 5 and the gauge scale 6. The front of the casing 4 may be and preferably is covered with glass to protect the contents thereof.

The lower end of the tube 5 is connected with a T 7 which has one of its legs joined to a pipe 8 and the other to a pipe 9. The pipe 8 is connected to a suitable source of water supply, the flow of the water being controlled by the valve 10. The pipe 9 is engaged with one leg of a cross connection 11, having two of its legs closed by plugs 12 and 13 respectively and having its other leg connected by a pipe 14 to a valve 15, which in turn is connected to the receptacle 1 by the connection 16. It will be obvious that the valve 15 controls flow of liquid from the receptacle.

The top of the tube 5 terminates in a T 17 preferably having its top leg closed by a plug 18 and connected to an overflow pipe 19. This pipe may be connected to a drain pipe if desired, or the overflow may be permitted to discharge upon the floor. The receptacle is provided with the usual valve 20 for withdrawing liquid therefrom.

I shall now describe the operation of my invention as applied to a receptacle containing cream as the measured liquid and as employing water as the measuring liquid. For the purposes of the description I shall refer to these liquids as cream and water, although it is of course understood that I do not intend thereby to limit my invention in any manner. My invention may be practiced with any liquids which do not mix freely upon contact with each other.

Assuming that the receptacle 1 contains cream, the weight of which it is desired to ascertain, for purposes well known in the dairy industry, the valve 15 is retained in its normal closed position and water is admitted through the valve 10 until it reaches the overflow 19 when the valve 10 is closed. It is, of course, understood that at this stage the cream fills the connection 16 as far as the valve 15 and the water fills the pipes 9 and 14 and the cross connection 11. That is, the cream and water are separated merely by the valve 15. The valve 15 is then opened and the weight of the water in the tube 5 will force back the cream until equilibrium is established. Because of the difference in specific gravities of the two liquids, water being the heavier, the level of water in the tube will be lowered, and when equilibrium is established the level of the water in the tube will be a measure of the weight of the cream in the receptacle. The scale 6 may be and preferably is graduated so that the level of water in the tube will directly indicate on the scale the weight of the cream in the receptacle.

When it is desired to clean the appartus, it may be easily done by removing the plug 18, when a brush or the like may be forced through the tube 5. The cleaning may also be effected by merely permitting water to run through the tube through the outlet 19. The tube need be cleaned seldom because it never contains any liquid except water, in this example. When it is desired to clean the lower part of the apparatus this may be done by removing the plug 13 and if desired the plug 12, which will permit ready insertion of brushes. It will be seen that the arrangement of pipes and connections is such that a straight line is provided for the insertion of brushes so that all parts may be effectively cleaned.

From the above it will be seen that I have provided a novel and improved gauge which may be used to measure any liquid contained in a receptacle, the measuring being effected by means of a liquid of preferably greater specific gravity. As noted earlier in the specification, all that is necessary is that the two liquids shall not readily mix upon contact with each other. Wherever possible water is preferable because of its availability and cheapness and because it avoids staining the gauge tube. This staining and discoloring of the tube is one of the principal objections to the use of mercury which is commonly used in gauges.

I am aware that changes in the form, construction and arrangement of parts may be made without departing from the spirit and without sacrificing the advantages of the invention and I consider myself entitled to make all such changes as fairly fall within the scope of the following claims.

I claim:

1. The method herein described of measuring a supply of liquid contained within a receptacle provided with a gauge tube having at its lower end a valve-controlled connection with the receptacle, which method consists in filling the gauge tube, with its valve closed, to a predetermined point with measuring liquid of heavier specific gravity than the liquid to be measured, then opening the valve to permit the measuring liquid in the tube to flow to the bottom of the receptacle.

2. The combination of a receptacle containing liquid to be measured, a gauge tube and a scale associated therewith, the lower end of said tube having a valved connection with a source of supply of measuring liquid and also having a valved connection with the bottom of the receptacle, the measuring liquid being of heavier specific gravity than the liquid in the receptacle, whereby connection with the receptacle may be closed while the connection with the measuring liquid supply is open to admit measuring liquid to the tube and the valve in the connection with the measuring liquid supply may be closed while the valve in the receptacle connection is opened to permit the measuring liquid in the tube to flow to the receptacle until equilibrium is established between the level of the measuring liquid in the tube and the level of the measured liquid in the receptacle.

3. The combination of a receptacle containing liquid to be measured, a gauge tube and a scale associated therewith, a transverse pipe connected at one end to a source of measuring liquid supply and at its other end to the bottom of the receptacle and between its ends to the lower end of the gauge tube, the measuring liquid being of heavier specific gravity than the liquid in the receptacle, and valves in said transverse pipe on opposite sides of the gauge tube.

4. The combination of a receptacle containing liquid to be measured, a gauge tube and a scale associated therewith, said gauge tube being mounted on the receptacle and open at its upper end, valve means for admitting a measuring liquid to the lower end of said tube, the measuring liquid being of heavier specific gravity than the liquid in the receptacle, and valved means connecting the lower end of said tube to the bottom of the receptacle.

5. The combination of a receptacle containing liquid to be measured, a gauge tube and a scale associated therewith, a valved connection to a source of measuring liquid supply, the measuring liquid being of heavier specific gravity than the liquid in the receptacle, a valved connection to the bottom of the receptacle, a T connection having one leg connected to the bottom of the tube and oppositely disposed legs connected to the measuring liquid supply connection and the receptacle connection, and a removable plug in the receptacle connection in alignment with the oppositely disposed legs of said T.

JOSEPH COOK.